United States Patent
Nicolai et al.

(10) Patent No.: US 7,467,239 B2
(45) Date of Patent: Dec. 16, 2008

(54) METHOD AND SYSTEM FOR PROGRAMMING A DMA CONTROLLER IN A SYSTEM ON A CHIP, WITH THE DMA CONTROLLER HAVING SOURCE, DESTINATION, AND SIZE REGISTERS

(75) Inventors: Jean Nicolai, Chateauneuf le Rouge (FR); Albert Martinez, Bouc Bel Air (FR)

(73) Assignee: STMicroelectronics SA, Montrouge (FR)

( * ) Notice: Subject to any disclaimer, the term of this patent is extended or adjusted under 35 U.S.C. 154(b) by 303 days.

(21) Appl. No.: 11/185,529

(22) Filed: Jul. 20, 2005

(65) Prior Publication Data

US 2006/0026311 A1 Feb. 2, 2006

(30) Foreign Application Priority Data

Jul. 21, 2004 (FR) ................................. 04 08084

(51) Int. Cl.
*G06F 13/10* (2006.01)
*G06F 13/14* (2006.01)

(52) U.S. Cl. .......................................... 710/26; 710/22
(58) Field of Classification Search ..................... 710/2, 710/22, 26
See application file for complete search history.

(56) References Cited

U.S. PATENT DOCUMENTS

| | | | |
|---|---|---|---|
| 4,849,875 | A | 7/1989 | Fairman et al. |
| 5,659,798 | A | 8/1997 | Blumrich et al. |
| 5,887,190 | A | 3/1999 | Priem et al. |
| 5,890,220 | A | 3/1999 | Mochida et al. |
| 6,239,810 | B1 * | 5/2001 | Van Hook et al. ........... 345/420 |
| 6,370,601 | B1 * | 4/2002 | Baxter ......................... 710/65 |
| 2002/0078268 | A1 * | 6/2002 | Lasserre ...................... 710/22 |

FOREIGN PATENT DOCUMENTS

EP 0447 145 9/1991

(Continued)

OTHER PUBLICATIONS

Definition of TLB, www.webopedia.com, p. 1.*

(Continued)

*Primary Examiner*—Eddie P Chan
*Assistant Examiner*—Hyun Nam
(74) *Attorney, Agent, or Firm*—Lisa K. Jorgenson; Stephen Bongini; Fleit Gibbons Gutman Bongini & Bianco P.L.

(57) ABSTRACT

A procedure is provided for programming a DMA controller of a system on a chip that includes a CPU, an MMU, a DMA controller including source, destination, and size registers, and entities that are each identified by a physical address and addressable by applying that physical address to the address bus. In response to a first dedicated instruction of a user program, the virtual address is translated into a corresponding physical address, the corresponding physical address is applied to the address bus, a signal having a first value is delivered to the DMA controller, and a signal having a second value is delivered to the entities. When the signal delivered to the DMA controller has the first value, the source register or the destination register of the DMA controller is selected and the corresponding physical address on the address bus is stored in the selected register.

22 Claims, 2 Drawing Sheets

FOREIGN PATENT DOCUMENTS

JP        05216809        8/1993

OTHER PUBLICATIONS

Evangelos P. Markatos et al., "User-Level DMA Without Operating System Kernel Modification", High-Performance Computer Architecture, 1997, Third International Symposium on San Antonio, TX, Feb. 1997, XP010213223, pp. 322-331.

Matthias A. Blumrich et al., "Protected, User-Level DMA for the SHRIMP Network Interface", High Performance Computer Architecture, 1996, Second International Symposium on San Jose, CA, Feb. 1996, XP010162056, pp. 154-165.

French Preliminary Search Report dated Mar. 7, 2005 for French Application No. 04 08084.

French Preliminary Search Report dated Jan. 25, 2005 for French Application No. 04 06666.

French Preliminary Search Report dated Feb. 21, 2005 for French Application No. 04 07763.

* cited by examiner

| INSTRUCTIONS | ADDRESS BUS BA | DATA BUS BD | Wire f1 lev. | Wire f2 lev. |
|---|---|---|---|---|
| $S_1$: "Store DMA VA_SRC" | PA_SRC | ASID (M1) | high | low |
| $S_2$: "STOREDMA (VA_DEST, t)" | PA_DEST | ASID, t (M2) | high | low |
| L: "LoadDMA VA_DEST" | ASID (M3) | STATUS | low | high |

{ Seq

FIG.3.

METHOD AND SYSTEM FOR PROGRAMMING A DMA CONTROLLER IN A SYSTEM ON A CHIP, WITH THE DMA CONTROLLER HAVING SOURCE, DESTINATION, AND SIZE REGISTERS

CROSS-REFERENCE TO RELATED APPLICATIONS

This application is based upon and claims priority from prior French Patent Application No. 04 08084, filed Jul. 21, 2004, the entire disclosure of which is herein incorporated by reference.

FIELD OF THE INVENTION

The present invention relates to silicon integrated systems or SoC (System on a Chip), and more specifically to the programming of the DMA controller of an SoC.

BACKGROUND OF THE INVENTION

A silicon integrated system or System on a Chip (SoC) includes at least a central processing unit (CPU) on which programs can be run, a direct memory access controller (DMA controller), a memory and a memory management unit (MMU). Such SoCs are typically included in electronic devices such as general purpose computers, decoder units or "Set-Top-Boxes", personal digital assistants or PDAs, mobile phones, etc.

In the physical memory, a variable size memory space is dynamically allocated to each application program or user program. More specifically, each user program has access to only some of the pages of the physical memory. These pages form a memory space (which may be discontinuous) which is addressed at memory bus level by physical addresses, but which is known to the user program via an address space (normally continuous) called a virtual address space which the program accesses with virtual addresses. The virtual address space is specific to the user program. The relationship that links the virtual addresses in the address space and the physical addresses in the physical memory is stored in the form of a translation table, called a page table, which is managed by the operating system and stored in the main memory. The latest address translations computed by the MMU table reloading unit are stored in a specific cache memory called a TLB (Translation Look-aside Buffer).

Each entry of the TLB, that is, each line corresponding to a translation in the TLB, comprises an address space identifier (ASID) to distinguish identical virtual addresses in different address spaces. Each ASID is linked, on a one-to-one basis, to a defined address space of the system.

The DMA controller performs data transfers between the internal memory of the SoC and entities such as peripheral memory devices (for example, hard disks) based on information supplied to it. This information comprises the source physical address of the transfer, the destination physical address of the transfer and the size of the memory area to be transferred.

Conventionally, a program requesting programming of the DMA controller for a DMA transfer running on the SoC in user mode (also called application mode or non-privileged mode) supplies a virtual address, which is the virtual address of the source of the DMA transfer or the destination of the DMA transfer, to the operating system or OS. The OS, running in privileged mode (also called supervisor mode or kernel mode) then takes control, translates the supplied virtual address into a corresponding physical address. It requires in turn storage of the source physical address of the transfer obtained in the source register, storage of the destination address in the destination register and storage of the size in the size register, and this from the virtual address of the registers. The OS then supervises the transfer performed by the DMA controller based on the information stored in its registers and notifies the program initiating the request of the result of the transfer.

The store instructions normally used are of the type: "STORE pa_src@dma_src_reg_adr", "STORE pa_dest@dma_dest_reg_adr" and "STORE size@dma_size_reg_adr", in which "pa_src" is the source physical address, "pa_dest" is the destination physical address, "size" is the size of the memory area transferred, "dma_src_reg_adr", "dma_dest_reg_adr" and "dma_size_reg_adr" are respectively the virtual addresses of the source, destination and size registers. The first instruction above in plain language means "store the data corresponding to the source physical address "pa_src" in the source address register of the DMA controller whose virtual address is "dma_src_reg_adr"". This instruction therefore supplies a virtual address argument "dma_src_reg_adr" and a data argument "pa_src" to be stored at the address supplied as an address argument.

With reference to FIG. 1 which shows an example of a conventional SoC, the conventional programming path for the DMA controller is as follows: the virtual address "dma_src_reg_adr" is supplied by the CPU to the MMU over the virtual address bus VA. The MMU translates it into a physical address, checks the rights of access to this physical address, then applies it to the physical address bus PA, via which this physical address is made available in particular to the DMA controller on the general bus A which is linked to a set of entities comprising, for example, disk controllers, physical memory, etc.

In parallel, the source physical address "pa_src" is applied by the CPU to the data bus DAT, from which this physical address is made available on the general data bus D, also linked to the set of entities.

The source address and the address of the source register are respectively applied to the general data bus D and to the general address bus A according to the protocol adopted for bus management. Depending on the bus management protocols, the physical address of the source register is applied, for example, to the general address bus A practically at the same time as the physical source address "pa_src" is applied to the general data bus D, or the address of the source register is positioned on the general address bus A one clock pulse before the source physical address is positioned on the general data bus D (for a protocol in which the addresses are positioned one clock pulse before the corresponding data), or even one of the addresses is applied on the rising edge whereas the other is applied on the falling edge, and so on.

The translation is performed by the MMU using a predefined translation table.

A number of attempts have recently been made to program the DMA controller directly by a program running in user mode, instead of by the OS. This stems in particular from the very high proportion of time required for programming of a DMA controller by the OS, compared to the data transfer time itself that is achieved by the DMA controller.

One of the difficulties encountered originates from the fact that the registers of the DMA controller must be programmed with physical addresses, whereas the programs in user mode do not have access to them and it is not desirable, particularly for security reasons, for the user programs to have access to physical addresses.

Solutions are proposed in the documents "User-Level DMA without Operating System Kernel Modification", by Evangelos P. Markatos and Manolis G. H. Katevenis (Institute of Computer Science, Science and Technology Park of Crete, 1997 IEEE), "Protected User-Level DMA for the Shrimp Network Interface", by M. A. Blumrich et al. (Proc of the $2^{nd}$ International Symposium on High Performance Computer Architecture, pages 154-165, February 1996) and "Integration of Message Passing and Shared Memory in the Stanford Flash Multi-Processor", by J. Heinlein et al. (Proc. of the 6th International Conference on Architectural Support for Programming Languages and Operating Systems, pages 38-50, 1994).

According to these solutions, the user program executes a general purpose store instruction already existing in the instruction set of the CPU, of the "STORE" type of instruction described above, but places as the address argument the source or destination virtual address that it wants to program in the DMA controller, and not the address of the register of the DMA controller to be programmed. The effect of this is to force the MMU to translate the virtual address supplied, which is a source or destination address, into a corresponding physical address. This technique also enables the MMU to check that the user program does indeed have the right to access this address.

Two additional difficulties had to be taken into account. First of all, it is essential to ensure that the DMA controller receives this physical address which is located on the address bus A, and writes it as data into its source or destination register. Moreover, it is also essential to allow the memory area to which the physical address applied to the bus corresponds, to disregard the STORE instruction because this instruction is not addressed to this memory area.

The above-mentioned document provides a solution to these problems. This solution consists in setting to 1 the most significant bit (MSB) of the source or destination address of a DMA transfer before this address is supplied to the MMU. Thus, the DMA controller receives, using its appropriate state machine, as data to be stored in one of its registers, any word including an MSB at 1 and present on the address bus A.

This solution therefore performs implicit addressing (or shadow addressing), based on the "STORE" instruction and the prefix 1.

The drawback of this technique is that the system must not include any memory area or peripheral device with an address beginning with 1, which halves the addressable memory space that is actually available. Thus, for a 32-bit (or 4 GB) system, the addressable memory space in practice is reduced by half, to $2^{31}$ bits (or 2 GB), which is very detrimental.

SUMMARY OF THE INVENTION

It is an object of the present invention to overcome this drawback.

A first embodiment of the present invention provides a method for programming a DMA controller in a system on a chip. This system on a chip includes a central processing unit, a memory management unit for translating a virtual address into a corresponding physical address according to a translation table, a DMA controller including a set of registers that include a source register, a destination register and a size register, and entities that are each identified by a physical address and addressable by applying that physical address to the address bus. According to the method, in response to a first dedicated instruction included in a user program and including a virtual address as an address argument, the following steps are performed. The virtual address is translated into the corresponding physical address, the corresponding physical address is applied to the address bus, a signal having a first value is delivered to the DMA controller, and a signal having a second value, which is different than the first value, is delivered to the entities. When the signal delivered to the DMA controller has the first value, the source register or the destination register is selected and the corresponding physical address that is on the address bus is stored in the selected register.

A second embodiment of the present invention provides a system on a chip that includes a DMA controller coupled to an address bus and a data bus, entities coupled to the address bus and the data bus, a central processing unit coupled to the DMA controller and the entities by control signal transmission means, and a memory management unit for translating virtual addresses into corresponding physical addresses according to a translation table. The DMA controller includes a set of registers including a source register, a destination register and a size register. Each entity is identified by a respective physical address and is addressable by applying that physical address to the address bus. The central processing unit is capable of executing a user program that includes a first instruction dedicated to programming the DMA controller, with the first instruction including an address argument indicating a virtual address. In response to receiving the first instruction, the central processing unit supplies the virtual address indicated by the address argument of the first instruction to the memory management unit, the memory management unit translates the virtual address into a corresponding physical address, the address bus receives the corresponding physical address, and the central processing unit delivers, via the control signal transmission means, a signal having a first value to the DMA controller and a signal having a second value, which is different than the first value, to the entities. When the signal delivered to the DMA controller has the first value, the DMA controller selects the source register or the destination register and stores the corresponding physical address that is on the address bus in the selected register.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 3 represents the various elements applied to the data bus and the address bus and the levels of the wires f1 and f2 when programming a DMA controller in an embodiment of the present invention.

DETAILED DESCRIPTION OF PREFERRED EMBODIMENTS

Preferred embodiments of the present invention will be described in detail hereinbelow with reference to the attached drawings.

Figure 1:
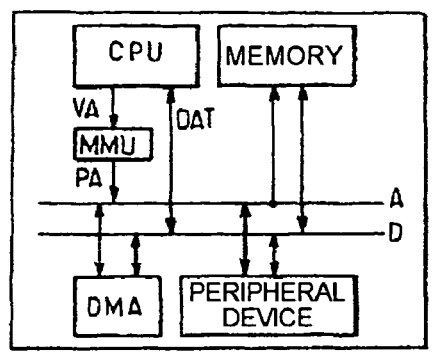
FIG. 1 is a representation of a conventional system on a chip.
Figure 2:
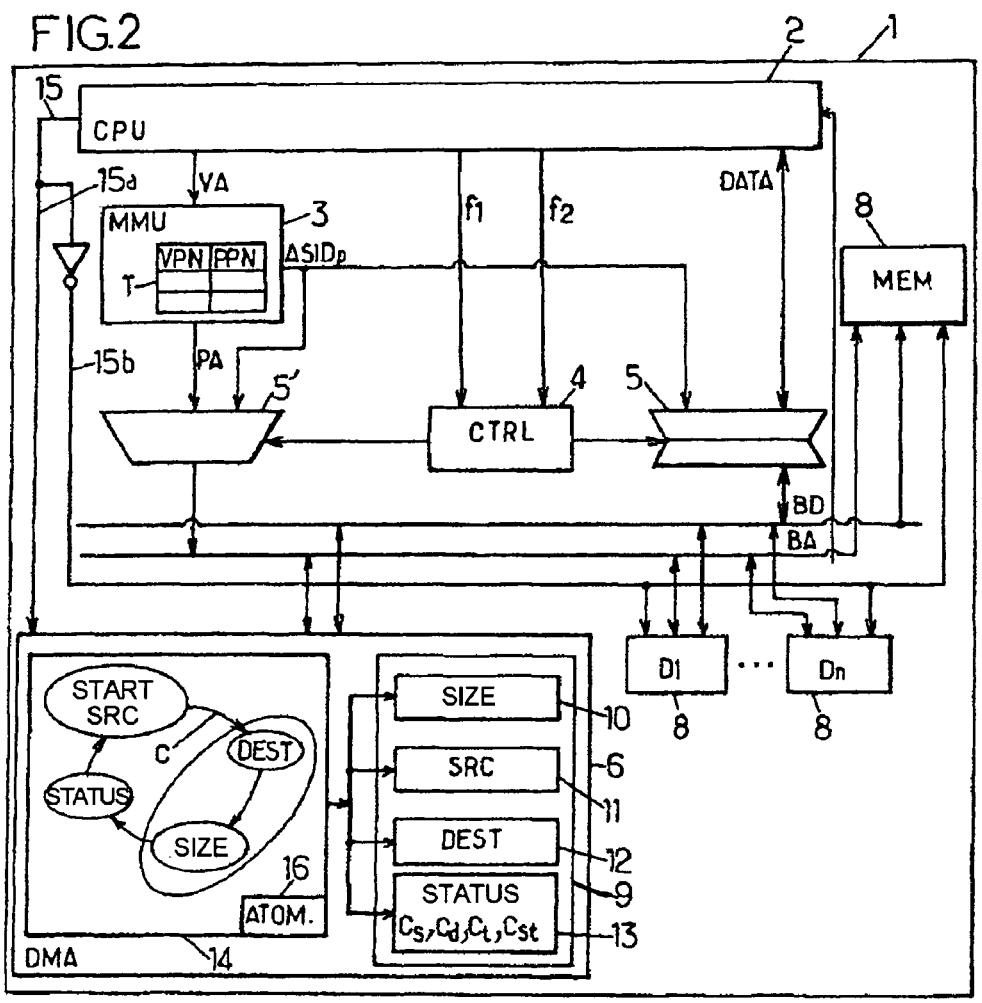
FIG. 2 represents a system on a chip according to an embodiment of the present invention.

FIG. 2 shows a system on a chip (SoC) according to an embodiment of the present invention. In this embodiment, the system on a chip 1 has a standard N-bit architecture, in which a virtual address is presented in the form of a number forming a virtual address encoded on N bits.

The architecture considered subsequently is a 32-bit architecture such that a virtual address is presented in the form of a number forming a page address or VPN (Virtual Page Number) encoded on the 20 most significant bits, followed by an offset in the page encoded on the 12 least significant bits. The present invention can, however, be implemented with any type of architecture.

The system on a chip 1 represented in FIG. 2 comprises a central processing unit or CPU 2, on which user programs are run.

The system on a chip 1 also comprises an MMU 3, a control block 4, a multiplexer/demultiplexer 5, a multiplexer 5' and a DMA controller 6.

The system on a chip also comprises additional entities 8.

The DMA controller 6 comprises a set 9 of registers that are required to perform the programming of a DMA transfer. This set 9 of registers comprises a size register 10, a source register 11, a destination register 12 and a status register 13. The size, source and destination registers 10, 11, and 12 are designed to respectively store the size, the source physical address and the destination physical address of the DMA transfer to be performed.

The DMA controller 6 also comprises a state machine 14 that is designed to select a register from the set 9 and store information in it. The state machine 14 comprises an atomicity register 16.

The general address bus BA interconnects the MMU 3, the DMA controller 6, the CPU 2 and the entities 8.

In the same way, a data bus BD interconnects these various elements.

The entities 8 are all functional devices other than the DMA controller 6 and are identified in the adopted architecture by a respective physical address. Each entity 8 is individually addressable by the application to the address bus BA of its respective physical address. Among these devices 8 there will typically be a RAM memory, peripheral controllers (memory or other) and/or functional devices (analog/digital converter, etc.) referenced $D_1$ to $D_n$.

The system on a chip 1 also comprises a control wire 15 that is dedicated to the transmission by the CPU 2 of a control signal. The control wire 15 is separated into two parts: a dedicated control wire 15a and another dedicated control wire 15b. The control wire 15a is linked to the DMA controller 6. The control wire 15b comprises an inverter and is linked to each of the entities 8.

Thus, when a signal having a given logical value S is applied to the control wire 15, the control wire 15a delivers the signal with the logical value S to the DMA controller 6, and a signal with the inverse logical value $\overline{S}$ to the entities 8.

In this exemplary embodiment, from an electrical point of view, the signal applied to the control wire 15a can be equal to a positive voltage +V (high level). The signal applied to the control wire 15b is then equal to a negative voltage −V (low level). In another case, the signal applied to the control wire 15a can be equal to a negative voltage −V (low level). The signal applied to the control wire 15b is then equal to a positive voltage +V (high level). A high level signal is typically considered a logic 1 value whereas a low level signal is typically considered a logic 0 value.

In this embodiment, the devices 8 are designed to disregard the elements applied to the address bus BA and the data bus BD when the signal delivered to them by the control wire 15b is at the low level.

The MMU 3 translates, in a known manner, a 32-bit virtual address supplied to it as input, by simply performing the translation of the most significant bits indicating the page (in this case the first 20 bits), or the translation of the VPN into the physical page number or PPN, using a predefined table T, which defines a virtual address space specific to each user program using an ASID. The MMU 3 also checks that the application initiating the translation does indeed have the appropriate rights.

The output of the MMU 3 is linked to a first input of the multiplexer/demultiplexer 5, and to a first input of the multiplexer 5'.

A virtual address bus VA links the CPU 2 to the input of the MMU 3. A data bus DATA links the CPU 2 to a second input of the multiplexer/demultiplexer 5.

Two wires f1 and f2 also link the CPU 2 to inputs of the control block 4, and can be set by the CPU 2 to a high level or to a low level.

The control block 4 controls the multiplexer/demultiplexer 5 and the multiplexer 5', as a function of the state of the wires f1 and f2. When the wire f1 is at the high level, the control block controls them to form, from elements supplied to the multiplexer inputs, output elements that are applied to the data bus BD for the multiplexer/demultiplexer 5, and to the address bus BA for the multiplexer 5', in accordance with the operation described below.

When the wire f2 is at the high level, the multiplexer/demultiplexer 5 is controlled by the control block 4 to allow passage from the data bus BD to the data bus DATA, so that the CPU 2 can read status information applied on the data bus BD by the DMA controller.

The CPU 2 is designed, when executing an instruction dedicated to programming a DMA transfer, named "StoreDMA (argVA; argD)" in the description below and in the figures, in which "argVA" is a virtual address argument and "argD" is a data argument which is optional, to place the virtual address argument that is supplied on the bus VA, place the data argument on the DATA bus, set the wire f1 to the high level and set the control wire 15 to the high level. Such an instruction is executed when it is present in a user program P.

The MMU 3 translates the virtual address argument that is supplied into a corresponding physical address, according to the table T. Furthermore, the MMU 3 supplies this physical address to the multiplexer 5'.

The table T also contains, from the virtual address that is supplied as input to the MMU 3, the ASID specific to the user program P. The MMU 3 supplies this ASID, which unequivocally identifies the user program P, to the multiplexer/demultiplexer 5 and to the multiplexer 5'. In this example, this ASID is encoded on 8 bits.

In response to setting the wire f1 to the high state, the control block 4 is designed to control the multiplexer/demultiplexer 5 to apply to the data bus BD a word comprising the ASID in the 8 most significant bits, followed by the data argument supplied on the DATA bus. In response to setting the wire f1 to the high state, the control block 4 is also designed to control the multiplexer 5' to apply to the address bus BA the physical address then delivered by the MMU 3 to the multiplexer 5'.

These applications on buses BA and BD are performed under the control of the control block 4 at respective moments linked in relation to each other (for example, quasi-simultaneously, or one of these applications one clock pulse before the other, etc.) and according to the bus management protocol adopted.

The CPU 2 is also designed, on executing in a user program P an instruction dedicated to the programming of a DMA transfer, named "LoadDMA (argVA)" in the description below and in the figures, in which "argVA" is a virtual address argument, to place the virtual address argument that is supplied on the bus VA, set the wire f2 to the high level and set the control wire 15 to the high level.

As before, from the virtual address supplied to the MMU 3 on the bus VA, the ASID specific to the user program P contained in the table T is supplied to the multiplexer 5' and to the multiplexer/demultiplexer 5.

In response to setting the wire f2 to the high state, the control block 4 is designed to control the multiplexer 5' to apply to the address bus BA a word M' comprising this ASID in the 8 most significant bits.

The CPU 2 is designed to set the control wire 15 to the low level for all cases that do not correspond to the execution of these "StoreDMA" and "LoadDMA" instructions.

The operation of the state machine 14 of the DMA controller 6 of this exemplary embodiment will now be described.

When the state machine 14 detects that the signal delivered to the DMA controller 6 on the control wire 15a is at the high level, the state machine 14 selects at least one register from the size, source, destination and status registers 10, 11, 12, and 13 of the set 9, according to its state of progress in an ordered cycle C of states. Then it performs storage or extraction operations in relation to the selected register.

The cycle C comprises "source", "destination", "size" and then "status" states, before reverting to the starting state.

More specifically, when the state machine 14 is at the start of a DMA controller programming procedure, it is in the "source" state, which enables it to select the source register 11 when the control wire 15a is next set to the high state. Then once the source register 11 has been selected, the state machine 14 increments its pointer, then points to the destination register 12 and is then in the "destination" state which enables it to select the destination register 12 when the control wire 15a is next set to the high state. Then once the destination register 12 has been selected, the state machine 14 increments its pointer, then points to the size register 10 and selects the size register 10 during the same high state as that used to select the destination register 12. Then, when the size register 10 has been selected, the state machine 14 increments its pointer, then points to the status register 13 and is then in the "status" state which enables it to select the status register 13 when the control wire 15a is next set to the high state. Then, once the status register 13 has been selected, the state machine 14 again points to the source register 11, and is once again in the "source" state in which it is ready to program the registers 10, 11, 12, and 13 of the set 9 for a new DMA transfer. Other embodiments of the state machine and the DMA controller are described below.

In the embodiment just described with reference to FIG. 2, the state machine 14 is also designed, when the control wire 15a is set to the high level and when it is in a state other than the "status" state, to capture, before performing a storage operation in the size, destination or source registers 10, 12 or 11, the 8 most significant bits in a word that is then applied to the data bus BD.

If the state machine 14 is in the starting state, these 8 bits are stored in the atomicity register 16. The state machine 14 then points to the source register 11. The elements then applied to the address bus BA are then stored by the state machine 14 in the source register 11. Then depending on whether the storage performed in the source register 11 has been completed successfully or not, the state machine 14 completes a field Cs in the status register 13 which is dedicated to the storage status of elements concerning the source, with a code indicating a success or a failure.

If the state machine 14 points to the destination register 12, the 8 bits extracted from the word applied to the data bus BD are compared to those present in the atomicity register 16.

If they do not match, the storage to be performed in the destination register 12 that is pointed to is not carried out, and the state machine 14 completes two fields (Cd and Ct) defined in the status register 13 and dedicated to the status of the operations relating to the storage of the address of the destination, or of the size, with a code indicating a failure.

If they match, the state machine 14 then stores the elements applied to the address bus BA in the destination register 12. Then, depending on whether this storage is completed successfully or not, the status register 13 is updated with a code indicating a success or a failure of the destination address storage operation.

The state machine 14 then points to the size register 10, and the bits following the 8 bits extracted from the word applied to the data bus BD are stored in the size register 10, and the state machine 14 completes the defined field $C_t$ in the status register 13 with the code indicating a success or a failure, depending on whether this size storage operation has been completed successfully or not.

The state machine 14 is designed to capture, when it points to the status register 13 ("status" state), the 8 bits extracted from the word then applied to the address bus BA and to compare them with those present in the atomicity register 16. If they do not match, the state machine 14 completes a field $C_s$ dedicated to the status operation in the status register 13 with a code indicating a failure.

Then, independently of whether or not there is a match between the 8 bits extracted from the word applied to the address bus BA and those present in the atomicity register 16, the state machine 14 applies the content of the status register to the data bus BD.

This application is used to supply a report to the CPU 2 on the operations performed for programming the DMA transfer.

Moreover, a user program P is run on the CPU 2 to perform a programming operation on the DMA controller 6 using a 32-bit source virtual address VA_SRC, a 32-bit destination virtual address VA_DEST and a size t of the memory area to be transferred.

It thus comprises a sequence Seq of three instructions which will be executed in turn.

The sequence Seq of instructions comprises the "StoreDMA" and "LoadDMA" instructions described above with respective arguments, such as:

"StoreDMA VA_SRC" (instruction "S1"), then
"StoreDMA (VA_DEST; t)" (instruction "S2"), then
"LoadDMA VA_DEST" (instruction "L").

When executing the instruction S1 "StoreDMA VA_SRC", the CPU 2 places the virtual address argument that is supplied VA_SRC on the bus VA and sets the wire f1 to the high level.

The MMU 3 translates the virtual address argument that is supplied VA_SRC into a physical address PA_SRC according to the table T, which also contains the ASID specific to the user program P and supplies the physical address PA_SRC as input to the multiplexer 5'. The MMU 3 also supplies this ASID, which identifies the user program P from which the "StoreDMA VA_SRC" instruction originates, as input to the multiplexer 5' and the multiplexer/demultiplexer 5.

The multiplexer/demultiplexer 5 is controlled by the control block 4 to allow a word M1, comprising 8 most significant bits equal to the ASID which is supplied to the multiplexer/demultiplexer 5 as input by the MMU 3, to be applied to the data bus BD. Since no data argument has been supplied with the instruction S1, the word M1 includes only these 8 bits.

In parallel with this application to the data bus BD, the multiplexer 5' is controlled by the control block 4 to allow the physical address PA_SRC, derived from the translation performed by the MMU 3, to be applied to the address bus BA. The CPU 2 also orders the control wire 15 to be set to the high level, and consequently the control wire 15a to be set to the high level and the control wire 15b to be set to the low level.

The applications to the buses BA and BD and the levels of the wires f1 and f2 are represented in FIG. 3, which shows a table in which each row corresponds to a DMA controller programming instruction executed on the CPU 2 according to the progress of the sequence Seq ("instructions" column), the elements applied to the address bus BA ("address bus BA" column) and the data bus BD ("data bus BD" column), and to the levels of the wires f1 and f2 following execution by the CPU 2 of the instruction.

The state machine 14 of the DMA controller 6 is first in its starting state for DMA transfer programming, according to the given cycle C. The state machine 14 then points to the source register 11. When the state machine 14 detects that the control wire 15a is at the high level, it extracts the first 8 bits of the word M1 then applied to the data bus BD and stores them in the atomicity register 16. Furthermore, the state machine stores the address PA_SRC applied to the address bus BA in the source register 11. Then the state machine 14 completes the field $C_S$ in the status register 13 and increments its pointer to point to the destination register 12, according to the cycle C.

When executing the instruction S2 "StoreDMA (VA_DEST; t)", the CPU 2 places the virtual address argument that is supplied VA_DEST on the bus VA, the data argument t on the data bus DATA and sets the wire f1 to the high level.

The MMU 3 translates the virtual address argument that is supplied VA_DEST into a physical address PA_DEST according to the table T, which also contains the ASID specific to the user program P. The MMU 3 supplies this ASID as input to the multiplexer 5' and the multiplexer/demultiplexer 5.

The MMU 3 supplies the physical address PA_DEST to the multiplexer 5'.

The multiplexer/demultiplexer 5 is controlled by the control block 4 to allow a word M2, represented in FIG. 3 and comprising 8 most significant bits equal to the ASID supplied to the multiplexer/demultiplexer 5 as input by the MMU 3 and comprising, encoded from the 9th bit, the size t supplied as input to the multiplexer/demultiplexer 5 via the DATA bus, to be applied to the data bus BD.

The multiplexer 5' is controlled by the control block 4 to allow the physical address PA_DEST, derived from the translation performed by the MMU 3, to be applied to the address bus BA. The CPU 2 controls the setting of the control wire 15 to the high level, and consequently the setting of the control wire 15a to the high level and the setting of the control wire 15b to the low level.

The state machine 14 of the DMA controller 6 points to the destination register 12. When the state machine 14 detects that the control wire 15a is at the high level, it extracts the first 8 bits of the word M2 then applied to the data bus BD and compares them with those stored in the atomicity register 16.

If they match, the state machine 14 stores the address PA_DEST applied to the address bus BA in the destination register 12, completes the field Cd in the status register 13, and increments its pointer to point, in accordance with the cycle C, to the size register 10. Then the state machine 14 extracts the bits following the first 8 bits encoding the ASID specific to the user program P in the word M2 and stores them in the size register 10. Then the state machine 14 completes the field $C_t$ in the status register 13.

If they do not match, the storage operations to be performed in the destination and size registers 12 and 10 are not carried out, and the state machine 14 completes the fields $C_d$ and $C_t$ with the code indicating a failure.

On executing the last instruction L ("LoadDMA VA_DEST") of the sequence Seq in the user program P, the CPU 2 places the virtual address argument that is supplied (VA_DEST) on the bus VA and sets the wire f2 to the high level.

The MMU 3 translates the virtual address argument that is supplied VA_DEST into a physical address PA_DEST according to the table T and supplies the corresponding ASID as input to the multiplexer 5' and the multiplexer/demultiplexer 5.

The multiplexer 5' is controlled by the control block 4 to allow a word M3, represented in FIG. 3 and comprising 8 most significant bits equal to the $ASID_P$ supplied to it as input by the MMU 3, to be applied to the address bus BA.

The multiplexer/demultiplexer 5 is controlled by the control block 4 to allow passage from the data bus BD to the data bus DATA so that the CPU 2 can read the status once it is applied by the DMA controller 6.

The CPU 2 in parallel controls the setting of the control wire 15 to the high level, and consequently the setting of the control wire 15a to the high level and the setting of the control wire 15b to the low level.

The state machine 14 of the DMA controller 6 then points to the status register 13. When the state machine 14 detects that the control wire 15a is at the high level, it extracts the first 8 bits of the word M3 then applied to the address bus BA and compares them with those stored in the atomicity register 16.

If they are different, the state machine enters a failure code in the field $C_{st}$ of the status register 13.

Then, whether the identifiers match or not, the state machine 14 selects the status register 13, applies its content to the data bus BD and then increments its pointer to return to the starting point of the cycle C of the state machine 14.

The processing of the sequence Seq for programming the DMA controller 6 is thus completed.

The DMA controller 6 now holds the source, size and destination data that it needs to perform the transfer.

Accordingly, the present invention, by introducing the new dedicated instruction "StoreDMA", can be used to perform the programming of the DMA controller without offering the user programs access to the physical addresses and without presenting the drawback of the significant waste of addressable memory space, as in the conventional solutions, while being compatible with a CPU, an MMU, and a standard 32-bit memory.

The "LoadDMA" instruction can be used to check the correct completion of the programming operations.

The present invention allows the MMU not to be modified and thus adds no significant degradation to the processing of the virtual addresses supplied to the MMU for translation that are not concerned with the programming of the DMA controller (when the wires f1 and f2 are at the low level).

On the programming of the DMA controller, the entities 8 (for example, the RAM memory) are controlled, by setting the control wire 15b to the low level, so as not to consider the elements then placed on the address bus BA and the corresponding elements placed on the data bus BD. Thus, even if the address of an entity 8 is applied to the address bus (such as transfer source or destination), this entity will not consider that the corresponding elements applied to the data bus BD are intended for it. Conversely, if the entities 8 are to be addressed, the control wire 15b will be set to the high level and the control wire 15a to the low level.

In another embodiment, the size information t is delivered to the DMA controller using a specific conventional instruction of the type "STORE t @dma_size_reg_adr", in which "dma_size_reg_adr" is the virtual address of the size register. In this case, the cycle C of the DMA state machine no longer includes a state relating to the size, because the size register is selected directly on detection by the DMA controller of the physical address of the size register on the address bus BA.

In yet another embodiment, the system on a chip 1 is designed, when the programming instruction received is the instruction "L" (wire f2 to the high level), to insert in the word $M_3$ then to be applied to the address bus BA, a code $X_{ST}$ indicating the status register.

The DMA controller is then designed, when the control wire 15a is in the high state, to select the status register in a word applied to the address bus BA and including the code $X_{ST}$. Since the status register can thus be designated explicitly in a word on the data bus, the cycle of the state machine is then polled only in the case where the register to be selected is not explicitly designated. The cycle, in the case where a code has been defined for the status register, then has only three states: a starting "source" state, a "destination" state and a "size" state.

In still another embodiment, the state machine, for example with a three-state cycle as described above, is integrated in the control block (i.e., it is no longer included in the DMA controller). The state is modified according to the cycle as and when a "StoreDMA" instruction is received (wire f1 in the high state). In this case, a code $X_S$ or $X_{DEST}$ is inserted in the word applied to the data bus BD when the wire f1 is at the high level. Thus, when the wire f1 is at the high level, if the current state of the cycle is the "destination" state, the state machine in the control block selects the code $X_{DEST}$, and if the current state of the cycle is the "source" state, the state machine selects the code $X_S$. Then the selected code is inserted after the ASID in the word then applied to the data bus BD. In this embodiment, the DMA controller is designed to determine the register to be selected according to the code $X_S$, $X_{DEST}$ or $X_{ST}$ in the word applied to the data bus BD (in particular, if the code is $X_{DEST}$, the DMA controller selects the destination register to store the address applied to the address bus BA, then the size register to store the size also included in the word applied to the data bus BD).

The use of identifiers (in this case the ASID relating to the user program P which generated the instruction) enables the atomicity of the instructions which follow each other to be checked on the DMA controller. This arrangement can be used to identify the insertion of an instruction originating from a user program P' different from the user program P so as not to mix the information relating to multiple DMA transfers. When the DMA controller is a multiple-channel DMA controller, that is, capable of completing several sets of registers (of the type of the set 9 of registers) in parallel, the identifier can also be used to select the size, source, destination or status register in the set that relates to the program P.

In a further embodiment, the identifiers of the user programs performing a programming of the DMA controller are disregarded in the state machine. In this case, there is no need for the atomicity register 16, or to transmit the identifier to the DMA controller. Other arrangements are then made to overcome problems of non-atomicity of the DMA controller programming instructions.

In another embodiment, the "LoadDMA" instruction for ascertaining the programming status can be used after each "StoreDMA" instruction.

In yet another embodiment, the virtual address argument of the "LoadDMA" instruction is the source virtual address VA_SRC, which corresponds to the same ASID as the virtual address VA_DEST.

In one embodiment, the "LoadDMA" instruction does not comprise any address argument. In this case, however, the atomicity of this instruction with the preceding ones is not guaranteed.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for programming a direct memory access (DMA) controller of a system on a chip, the system on a chip including a central processing unit for executing a user program, a memory management unit for translating a virtual address into a corresponding physical address according to a translation table, an address bus, a data bus, the DMA controller, and a plurality of entities coupled to the address bus and the data bus, the DMA controller including a set of registers that includes a source register, a destination register, and a size register, and each of the entities being identified by a physical address and addressable by applying that physical address to the address bus, said method comprising the steps of:

receiving a first dedicated instruction included in the user program, the first dedicated instruction being dedicated to programming the registers of the DMA controller and including a virtual address as an address argument; and in response to receiving the first dedicated instruction, programming at least one of the registers of the DMA controller, wherein the programming step includes the sub-steps of:

translating, by the memory management unit, the virtual address into the corresponding physical address;

supplying the corresponding physical address from the memory management unit to the address bus;

delivering, from the central processing unit via at least one dedicated control signal wire that is dedicated to delivering a DMA programming control signal from the central processing unit to the DMA controller and to the entities, the DMA programming control signal at first value to the DMA controller and at a second value, which is different than the first value, to the entities; and when the DMA controller receives the DMA programming control signal at the first value from the central processing unit via the at least one dedicated control signal wire, storing the corresponding physical address that is supplied from the memory management unit to the address bus in the source register or the destination register of the DMA controller.

2. The method for programming a DMA controller according to claim 1, wherein the programming step further includes the sub-step of:
   when the entities each receive the DMA programming control signal at the second value from the central processing unit via the at least one dedicated control signal wire, disregarding, by the entities, the corresponding physical address that is supplied from the memory management unit to the address bus.

3. The method for programming a DMA controller according to claim 1, wherein the programming step further includes the sub-steps of:
   determining, by the memory management unit, an identifier of the user program; and
   applying a first word comprising the identifier to the data bus.

4. The method for programming a DMA controller according to claim 3,
   wherein the first dedicated instruction also includes a data argument indicating size information,
   the first word also includes the size information, and
   the programming step also comprises the sub-step of storing the size information in the first word that is applied to the data bus in the size register of the DMA controller.

5. The method for programming a DMA controller according to claim 3, wherein the identifier is an address space identifier which is stored in the table of the memory management unit, and is determined by the memory management unit in the translating sub-step.

6. The method for programming a DMA controller according to claim 1,
   wherein the set of registers of the DMA controller also includes a status register, said method further comprises the steps of:
   receiving a second dedicated instruction included in the user program, the second dedicated instruction being dedicated to the programming of the DMA controller; and
   in response to receiving the second dedicated instruction, providing the status of the programming of the DMA controller to the central processing unit, and
   the providing step includes the sub-steps of:
   determining, by the memory management unit, an identifier of the user program;
   applying a second word comprising the identifier to the address bus;
   delivering, from the central processing unit via the at least one dedicated control signal wire, the DMA programming control signal at the first value to the DMA controller and at the second value to the entities; and
   when the DMA controller receives the DMA programming control signal at the first value from the central processing unit via the at least one dedicated control signal wire, applying the contents of the status register of the DMA controller to the data bus.

7. The method for programming a DMA controller according to claim 1, further comprising the step of:
   providing a state machine in the DMA controller, the state machine having an ordered cycle of states,
   wherein in the storing sub-step, the source register or the destination register is selected for storing the corresponding physical address as a function of a current state of the state machine.

8. The method for programming a DMA controller according to claim 1,
   wherein the at least one dedicated control signal wire extends from the central processing unit to the DMA controller and to each of the entities,
   the first value is the logical inverse of the second value, and
   the at least one dedicated control signal wire comprises an inverter.

9. A system on a chip comprising:
   a direct memory access (DMA) controller coupled to an address bus and a data bus, the DMA controller including a set of registers comprising a source register, a destination register, and a size register;
   a plurality of entities coupled to the address bus and the data bus, each of the entities being identified by a physical address and being addressable by applying that physical address to the address bus;
   a central processing unit capable of executing a user program, the user program including a first dedicated instruction that is dedicated to programming the registers of the DMA controller and includes an address argument indicating a virtual address;
   at least one dedicated control signal wire coupling the central processing unit to the DMA controller and to each of the entities, the at least one dedicated control signal wire being dedicated to delivering a DMA Programming control signal from the central processing unit to the DMA controller and to the entities; and
   a memory management unit for translating virtual addresses into corresponding physical addresses according to a translation table,
   wherein in response to receiving the first dedicated instruction:
   the central processing unit supplies the virtual address indicated by the address argument of the first dedicated instruction to the memory management unit,
   the memory management unit translates the virtual address into a corresponding physical address,
   the memory management unit supplies the corresponding physical address to the address bus,
   the central processing unit delivers, via the at least one dedicated control signal wire, the DMA programming control signal at a first value to the DMA controller and at a second value, which is different than the first value, to the entities, and
   when the DMA controller receives the DMA programming control signal at the first value from the central processing unit via the at least one dedicated control signal wire, the DMA controller stores the corresponding physical address that is supplied from the memory management unit to the address bus in the source register or the destination register.

10. The system on a chip according to claim 9, wherein when the entities each receive the DMA programming control signal at the second value from the central processing unit via the at least one dedicated control signal wire, the entities disregard the corresponding physical address that is supplied from the memory management unit to the address bus.

11. The system on a chip according to claim 9, wherein in response to receiving the first dedicated instruction:
   the memory management unit also determines an identifier of the user program,
   the data bus receives a first word comprising the identifier, and the DMA controller stores the corresponding physical address in either the source register or the destination register as a function of the identifier in the first word that is on the data bus.

12. The system on a chip according to claim 11,
wherein the first dedicated instruction also includes a data argument indicating size information,
the first word further comprises the size information, and
the DMA controller also stores the size information in the first word that is on the data bus in the size register.

13. The system on a chip according to claim 11, wherein the identifier is an address space identifier which is stored in the table of the memory management unit and is determined by the memory management unit from the virtual address indicated by the address argument of the first dedicated instruction.

14. The system on a chip according to claim 9,
wherein the set of registers of the DMA controller also includes a status register,
the user program also includes a second dedicated instruction that is dedicated to programming the registers of the DMA controller, and
in response to receiving the second dedicated instruction:
the memory management unit determines an identifier of the user program,
the address bus receives a first word comprising the identifier,
the central processing unit delivers, via the at least one dedicated control signal wire, the DMA programming control signal at the first value to the DMA controller and at the second value to the entities, and
when the DMA controller receives the DMA programming control signal at the first value from the central processing unit via the at least one dedicated control signal wire, the DMA controller applies the contents of the status register to the data bus.

15. The system on a chip according to claim 9,
wherein the DMA controller includes a state machine, and
the DMA controller stores the corresponding physical address in either the source register or the destination register as a function of a current state of the state machine in an ordered cycle of states.

16. The system on a chip according to claim 9, wherein the first value is the logical inverse of the second value, and the at least one dedicated control signal wire comprises an inverter.

17. An electronic device comprising at least one system on a chip according to claim 9.

18. A system on a chip comprising:
an address bus;
a data bus;
a direct memory access (DMA) controller coupled to the address bus and the data bus, the DMA controller including a set of registers comprising a source register, a destination register, and a size register;
a plurality of entities coupled to the address bus and the data bus, each of the entities being identified by a physical address and being addressable by applying that physical address to the address bus;
a central processing unit capable of executing a user program, the central processing unit being coupled to the DMA controller and the entities, and the user program including a first dedicated instruction that is dedicated to programming the registers of the DMA controller and includes an address argument indicating a virtual address; and
first means for, in response to the first dedicated instruction of the user program translating the virtual address indicated by the address argument of the first dedicated instruction into a corresponding physical address, applying the corresponding physical address to the address bus, delivering a DMA programming control signal at a first value to the DMA controller and at a second value, which is different than the first value, to the entities,
wherein in response to receiving the DMA programming control signal at the first value, the DMA controller stores the corresponding physical address that is applied to the address bus in the source register or the destination register.

19. The system on a chip according to claim 18, wherein in response to the entities each receiving the DMA programming control signal at the second value, the entities disregard the corresponding physical address that is applied to the address bus.

20. The system on a chip according to claim 18, wherein the first means, in response to the first dedicated instruction, also determines an identifier of the user program, and applies a first word comprising the identifier to the data bus.

21. The system on a chip according to claim 20,
wherein the first dedicated instruction also includes a data argument indicating size information,
the first word further comprises the size information, and
in response to receiving the DMA programming control signal at the first value, the DMA controller also stores the size information in the first word that is applied to the data bus in the size register.

22. The system on a chip according to claim 18,
wherein the set of registers of the DMA controller also includes a status register,
the user program also includes a second dedicated instruction that is dedicated to programming the registers of the DMA controller,
the first means, in response to receiving the second dedicated instruction of the user program, determines an identifier of the user program, applies a first word comprising the identifier to the address bus, and delivers the DMA programming control signal at the first value to the DMA controller and at the second value to the entities, and
in response to receiving the DMA programming control signal at the first value, the DMA controller applies the contents of the status register to the data bus.

* * * * *